June 28, 1955 R. D. ELBOURN ET AL 2,712,065
GATE CIRCUITRY FOR ELECTRONIC COMPUTERS
Filed Aug. 30, 1951
3 Sheets-Sheet 1
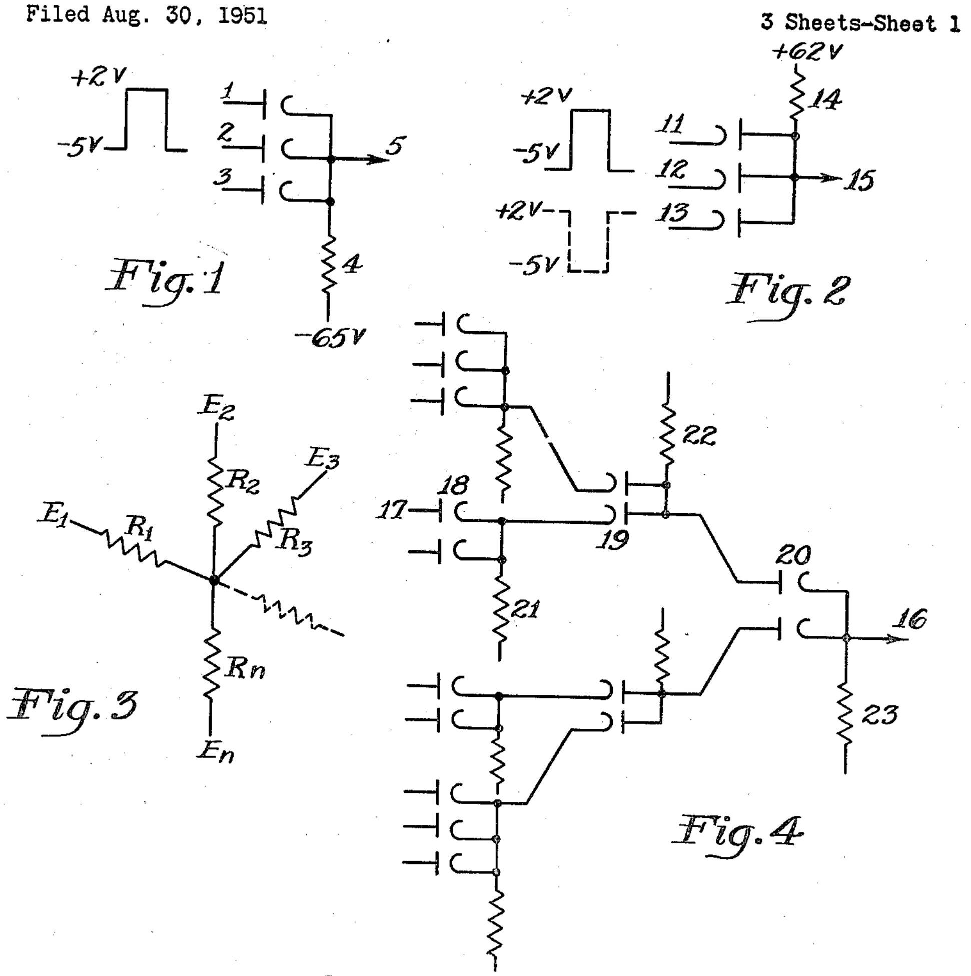
Fig. 1, Fig. 2, Fig. 3, Fig. 4
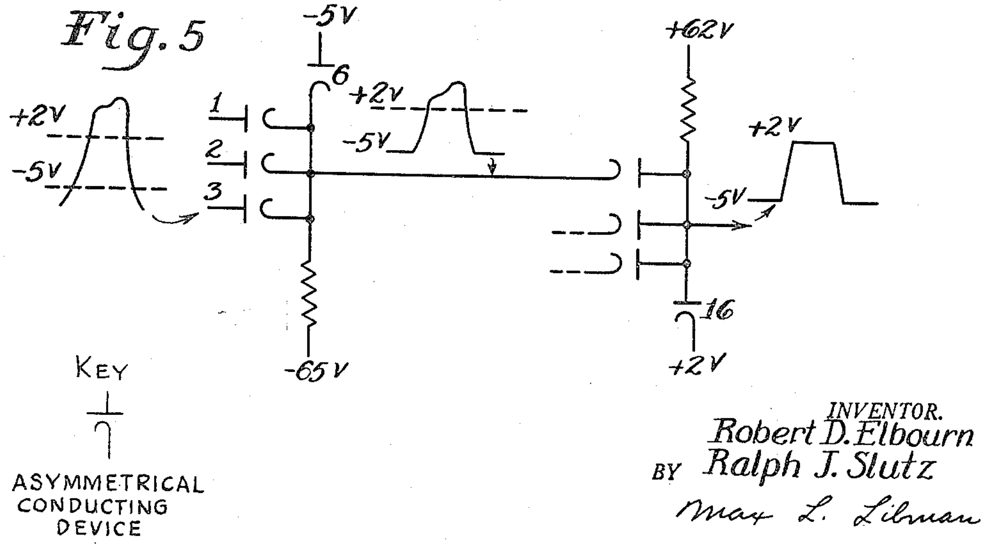
INVENTOR.
Robert D. Elbourn
BY Ralph J. Slutz
Max L. Libman
ATTORNEY INVENTOR.
Robert D. Elbourn
BY Ralph J. Slutz
Max L. Libman
ATTORNEY

GATE CIRCUITRY FOR ELECTRONIC COMPUTERS

INVENTOR.
Robert D. Elbourn
Ralph J. Slutz
BY Max L. Libman
ATTORNEY

United States Patent Office 2,712,065

Patented June 28, 1955

2,712,065

GATE CIRCUITRY FOR ELECTRONIC COMPUTERS

Robert D. Elbourn, Washington, D. C., and Ralph J. Slutz, Kensington, Md., assignors to the United States of America as represented by the Secretary of Commerce Application August 30, 1951, Serial No. 244,446

7 Claims. (Cl. 250—27)

(Granted under Title 35, U. S. Code (1952), sec. 266)

The invention described herein may be manufactured and used by or for the Government of the United States for governmental purposes without the payment to us of any royalty thereon in accordance with the provisions of the act of March 3, 1883, as amended (45 Stat. 467; 35 U. S. C. 45).

This invention relates to the art of "gating" in electronic digital computer circuitry wherein electric pulses of brief duration are utilized to control, actuate, and energize electronic circuit operations. The invention relates more particularly to certain innovations in circuitry which were devised in order that gate circuits composed of diode rectifying elements could be combined with pulse amplifiers composed of electron tubes and pulse transformers into reliably working systems. An example of a device using this invention is the electronic computer completed in 1950 at the National Bureau of Standards and known as SEAC (NBS Eastern Automatic Computer). A general description of this computer will be found in the Technical News Bulletin of the National Bureau of Standards, September 1950, pp. 121–129.

Basically the problem of gating that arises in such a computer is simply to produce a pulse on a given output lead, provided there occurs a prescribed pattern of pulses present or absent on certain other input leads. Any such condition can be described by a statement of form generally similar to the following: Produce a pulse on wire A if there are pulses on wire B and on wire C and not on wire D, or if there are pulses on wire C and on wire D and not on wire E. All such conditions can be worded in terms of the logical connectives "and," "or," and "not." Actually it is possible, though usually quite awkward, to use only the word "not" and either "and" or "or" alone; but the circuit equivalents of both "and" and "or" are very simple, hence both are used. Diode gating circuits capable of performing the logical operations of "and," "or," and "not" on electric pulses were described in a paper by T. C. Chen, "Diode coincidence and mixing circuits for digital computers," Proceedings of the Institute of Radio Engineers, volume 38, pp. 511–514, May 1950. The Chen report shows capacitance-coupled "and" and "or" gate circuits which have certain practical difficulties. These difficulties are eliminated by the invention as will be described in more detail below.

Prior gating circuits have been subject to the possibility of transmitting small spurious signals as a result of applying pulses to less than all of the input wires of an "and" or coincidence gate. A particular object of this invention is to definitely eliminate the possibility of transmitting any spurious signal or noise from this cause.

Another object is to provide definite upper and lower limits on the voltage of an output pulse from a gating structure while permitting input pulses of excess voltage amplitude in both directions to be applied from low impedance sources without causing excessive currents in any diodes.

Still another object is to provide means so that an and-gate which, as will be explained below, requires a pulse source having a low internal impedance during the interval between pulses, can be operated from such a source as a tube and pulse transformer which has instead a high internal impedance between pulses.

A further object is to prevent a spurious signal which may occur if the gate circuit is permitted to draw current through the secondary winding of the pulse transformer during the interval between pulses.

The specific nature of the invention, as well as other objects and advantages will clearly appear in more detail, with particular reference to the figures of the accompanying drawings in which:

Figure 1 is a schematic circuit diagram showing the essential features of a "maximum voltage circuit";

Figure 2 is a similar diagram of a "minimum voltage circuit";

Figure 3 is a circuit diagram of a network which is equivalent to a typical gate circuit;

Figure 4 is a circuit diagram of a hypothetical concatenation of gate circuits showing the possibility of combining such circuits;

Figure 5 is a circuit arrangement showing the manner in which positive voltage clipping may be introduced;

Figure 14:
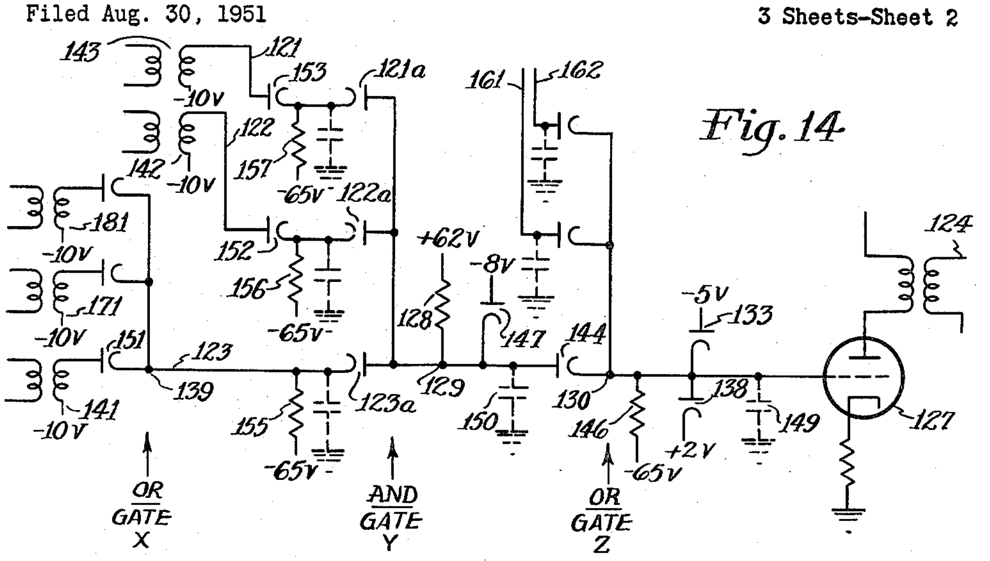
Figure 14 is another generalized typical gating circuit as used in SEAC.

Referring to Figure 1, if voltage sources are connected to the input wires 1, 2, and 3, the diode connected to the most positive voltage source will conduct current which flows through resistor 4 to the −65-volt terminal. Because the forward resistance of a diode is much smaller than that of resistor 4, the output wire 5 assumes nearly the voltage of the most positive input wire. The other input diodes are under these conditions nonconducting because their cathodes are at a more positive voltage than their anodes. Referring to Figure 2, in similar fashion the output wire 15 of the circuit in Figure 2 will assume nearly the voltage of the most negative of the input wires 11, 12, or 13.

Accordingly one might well describe Figure 1 as a "maximum voltage circuit" because its output voltage is practically equal to its most positive input voltage, and one might similarly describe Figure 2 as a "minimum voltage circuit." These circuits are, basically, star-connected resistance networks having the input voltage sources and the resistor's return voltage at the points of the star and the output lead as the common junction point of the star. The voltage assumed by this junction must satisfy the equation obtained by applying Kirchhoff's current law to the junction; therefore, in the notation of Figure 3, the junction voltage is $$E=\frac{\frac{E_1}{R_1}+\frac{E_2}{R_2}+\frac{E_3}{R_3}+\cdots+\frac{E_n}{R_n}}{\frac{1}{R_1}+\frac{1}{R_2}+\frac{1}{R_3}+\cdots+\frac{1}{R_n}}$$

Obviously, this is a weighted mean of the supply voltages with weights between 0 and 1; moreover, a greater weight attaches to a smaller resistance. This justifies an intuitive conception that the resistors pull the junction voltage toward their respective source voltage like springs with a smaller resistance corresponding to a stronger spring. If one resistance is much smaller than the parallel combination of all the others, then the output voltage will approximate the input voltage of that resistance. Practical maximum and minimum voltage circuits can have many more than the three input leads shown in Figures 1 and 2, because there are commercially available conveniently small and cheap metal rectifier diodes with back-to-front resistance ratio exceeding 1000, so it is very easy to meet the requirement that the conducting diode have a low resistance compared with the parallel combination of the resistor and the back resistances of the other diodes.

Referring back to Figure 1, if the input voltage sources supply positive going voltage pulses from some common base level such as −5 volts, then the "maximum" voltage circuit of Figure 1 will give a positive output pulse whenever any one, or any combination, of its input wires is pulsed. This is the logical "or" function, since an output pulse is delivered if one pulses input 1, or input 2, or input 3. If similar positive pulses are used with the "minimum" voltage circuit of Figure 2, then an output pulse will be delivered only if pulses are applied simultaneously to all the inputs 11, 12, and 13. This is the logical "and" function since one must pulse input 11, and input 12, and input 13 to produce an output pulse. It is also apparent that, if negative going voltage pulses are used, the maximum and minimum voltage circuits interchange their logical roles becoming "and" gates and "or" gates, respectively. It may be noted that, for either polarity of pulses, the or-gate is the one in which a pulse tends to increase current conduction in a diode; whereas the and-gate is the one in which a pulse tends to decrease current conduction in a diode.

The logical "not" function, sometimes called "pulse inhibition," can be achieved by using both positive and negative pulses in the same gate. Suppose, for example, that in the "minimum" circuit (Figure 2) inputs 11 and 12 are connected to sources of pulses that go positively from −5 volts to +2 volts, but that input 13 is connected to a source of pulses going negatively from +2 volts to −5 volts. Then a positive output pulse will be delivered only when there are pulses on 11 and on 12 and not on 13. In similar fashion negative pulses can be inhibited by applying positive pulses to an input of the "maximum" circuit (Figure 1). Of course, the use of these circuits is not limited to the particular voltage values used for illustration.

These elementary gating circuits can be connected together input-to-output into three-like configurations, like that shown in Figure 4, to operate according to any sentence expressed in "and," "or," and "not," as in the example given above, provided that one condition regarding the resistance values is observed. Notice that the output voltage on lead 16 will be determined by some one of the input voltages, say, for example, that of lead 17, only if all the diodes 18, 19, and 20 along the signal path from that input to the output are conducting. If they are conducting, their resistances are so low that all points along this signal path are at practically the same voltage; thus the output voltage, at 16, essentially equals the input voltage, at 17; moreover, the signal path effectively forms a common junction point for the star network of resistors 21, 22, and 23. Now diode 18 can be conducting only if the equilibrium voltage of resistors 21, 22, and 23 at this common junction point is below the voltage applied at 17. Similarly diode 19 can be conducting only if the equilibrium voltage of resistors 22 and 23 is above the voltage applied at 17. These observations can be generalized into the design rule: each resistor must be made small enough so that its equilibrium voltage with all the resistors connected nearer the output along the same signal path must be nearer to this resistor's supply voltage than any voltage on the required output waveform, to insure that the output voltage will swing to its full value in the direction toward which the resistor value pulls it. In practice even lower resistances may be required in order to charge or discharge the circuit capacitances within the permitted rise or fall times of the pulses.

In practice, the pulses used cannot be perfectly rectangular, since this would require an infinitely fast rise and fall to produce vertical "sides" of each pulse; the actual pulse is more or less trapezoidal, that is, the sides slope. The rise and fall rate of this slope has been arbitrarily set for SEAC at 100 volts per microsecond, which means that the pulse voltage must rise to its maximum (or flat-topped) value at the rate of 100 volts per microsecond, and must fall back to its normal value at the same rate. This insures that the maximum or flat-topped voltage level will last sufficiently long to permit proper operation of the circuits. Representative distributed capacitances of the various portions of the circuits are determined experimentally. The capacitance of one such portion is represented in Figure 14 by the dotted-line capacitors 149 and 150. A representative value for capacitor 149 is 15 micro-microfarads and for capacitor 150 is 5 micro-microfarads. The resistors are then selected so that with the positive and negative supplies selected (+62 volts and −65 volts, respectively) these capacitances will charge and discharge at the desired rate.

There is no limitation to the number of gate circuits that can be connected in series except that this requirement demands more current in gates which are more stages removed from the output, so that finally an impractically large input current will be required. On the other hand the theorem on canonical forms in Boolean algebra, the symbolic logic of propositions, shows that any gating function whatsoever can be realized with elementary gates arranged only two-deep in series. One can use either a set of or-gates feeding into one and-gate or a set of and-gates feeding into one or-gate; thus there are always two possible structures which are only two gates deep, although more gates in series are sometimes used in practical computer circuitry to reduce the number of diodes required or to adapt the gate structure to special electrical requirements of the terminal devices connected to it. Examples of this will appear below.

Figures 6, 7, 8:
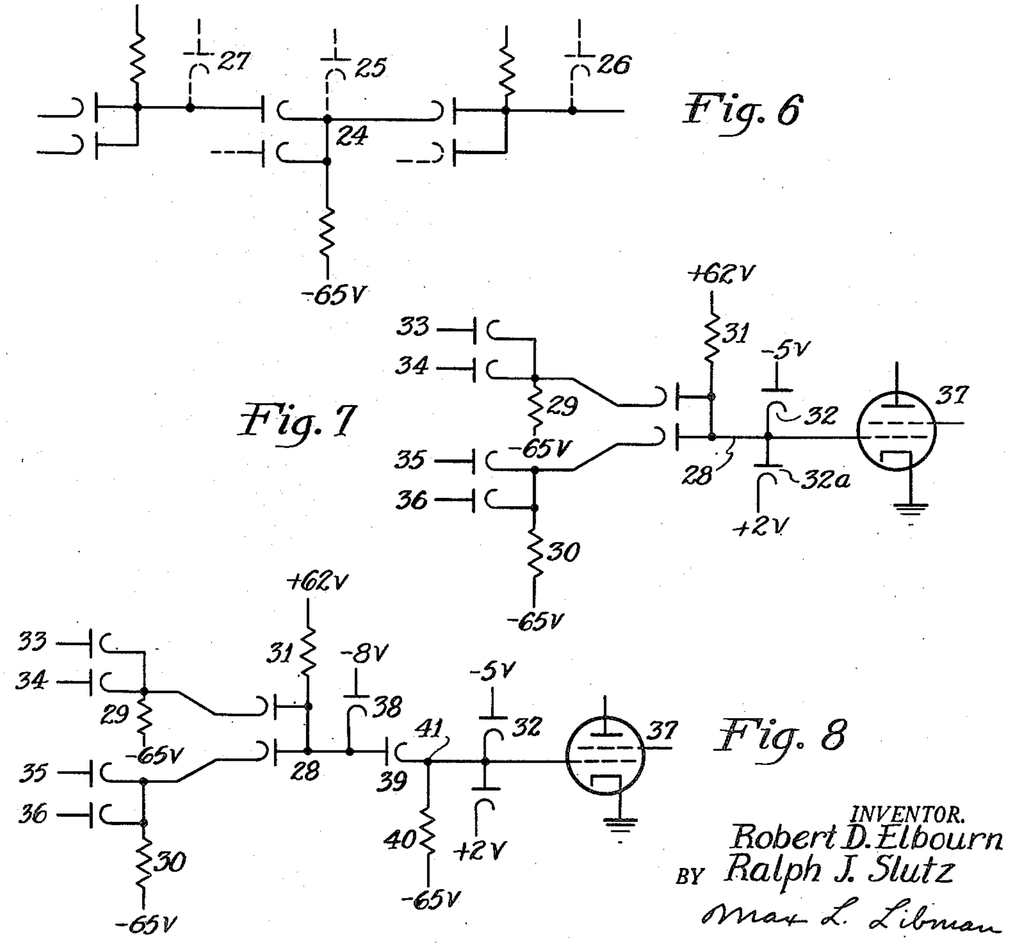
Figure 6 shows an alternative voltage clipping possibility in a typical gate circuit.
Figure 7 shows a typical voltage clipping arrangement.
Figure 8 depicts a gating arrangement with means for preventing spurious pulses.

It is usually desirable that the tops and bottoms of the output pulses be clipped to definite voltage levels rather than be permitted to follow the possibly irregular "overtravel" of the input pulses. If a pulse source is capable of delivering quite large currents, it is necessary that diodes doing this clipping are never thrown in short-circuit across the source because the short-circuit current may destroy a diode. They should instead clip at a point disconnected from the source by a nonconducting diode. As shown in Figure 5, the clipping voltages may be introduced at two stages in the gate structure through additional diodes, 6 and 16, which may be considered (from the voltage level point of view) as additional inputs in Figures 1 and 2, respectively, and by the same reasoning will limit the voltage level to the value of their respective supplied voltages, since they will then supply respectively the minimum and maximum voltages under the limiting conditions. The same maximum voltage or minimum voltage principle that governs the gating action also governs the clipping action. The polarities of the diodes are such that, as illustrated in Figure 6, a clipping diode 25 can be alternatively placed along the signal path one junction forward to position 26 or one junction backward to position 27. In either case junction 24 can drop below the clipping voltage by only the small forward voltage across two diodes in series. One might move the clipping diode in this fashion in order to save diodes by permitting one clipping diode to do the work of several. However, one must then inspect the circuit to be sure that the clipping diode has not been placed where it will short-circuit the source, as discussed above. For example, in Figure 6, a negative overshoot of input voltage could produce excessive current in its input diode and in the clipping diode if the latter were placed at 27.

The circuit in Figure 7 is an example of saving of clipping diodes by moving one forward one junction. For positive pulses this circuit has the canonical form of two or-gates feeding one and-gate. Only two clipping diodes, 32, and 32*a*, are required if they are both placed on an output wire which in this case is connected to the grid of a pulse-amplifying vacuum tube. The circuit in Figure 7 also serves to illustrate a difficulty characteristic of and-gates, namely, a tendency to produce small spurious signals. The circuit is so designed that the equilibrium voltage of junction 28 of the voltage divider formed by resistors 31 and either resistor 29 or 30 would be below −5 volts except that clipping diode 32 supplies current from a −5-volt source. If none of the inputs 33 to 36 is pulsed, then clipping diode 32 must supply current to both resistors 29 and 30 to hold the junction point 28 at −5 volts. If now one input, say 33, is pulsed to a voltage level higher than existing at junction 28, then this source will supply current to resistor 29. The current in diode 32 is reduced by this amount. This will reduce the forward voltage drop across diode 32 thus producing a small positive voltage signal on the grid of amplifier tube 37. Because tube 37 may have considerable voltage gain at −5 volts bias, the small spurious signal may in successive stages be amplified into a full-sized spurious pulse. A scheme for preventing such small spurious signals reaching the grid of the amplifier is shown in Figure 8. This consists in adding diodes 38 and 39 and resistor 40 to the circuit of Figure 7. Diode 39 and resistor 40 have the configuration of a logical or-gate except that there is only one input terminal. This we call a degenerate or-gate. The essential feature is that junction 41 is held up to −5 volts by clipping diode 32 whereas junction 28 is held up to only about −8 volts by clipping diode 38. Thus there is a back voltage of approximately 3 volts across the degenerate or-gate diode 39. Any signal at the and-gate's output junction 28 must exceed this 3 volts before diode 39 conducts; i. e., before any signal is produced at junction 41 which is connected to the grid of the amplifier tube. The value of 3 volts back bias across diode 39 was chosen in the design of SEAC simply because the diodes employed have a maximum forward voltage drop of about 2 volts at their maximum forward current. The particular value of voltage used is, of course, not an essental feature of the invention. If the gating structure required has as its output an or-gate fed by several and-gates, then this or-gate can be back-biased in the same manner as the degenerate or-gate 39 in Figure 8, as will be shown below at 144 in Figure 14. The only difference is that there will be additional gating diodes connected to junction 41.

Basically this invention can be applied to gates for either polarity of pulses. It eliminates small spurious signals given by an and-gate by following the and-gate with an or-gate whose diodes are normally—that is, in the no signal condition—held nonconducting by a back voltage larger than the signals to be eliminated.

Figure 9:
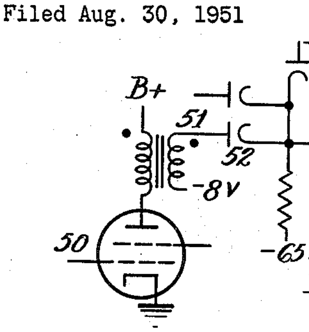
Figure 9 illustrates the use of an amplifier tube and pulse transformer as input means for an or-gate circuit.

It was desired in the design of SEAC to drive the gate structures from pulse amplifiers consisting of a vacuum tube and pulse transformer as described in patent applications Serial No. 205,164, Transformer-Coupled Pulse-Train Amplifier, filed by Martin et al., January 9, 1951, which issued as a U. S. Patent No. 2,650,995, on September 1, 1953, and Serial No. 218,865, High-Duty-Cycle Pulse Transformer Circuit, filed by William L. Martin, April 2, 1951. If positive pulses are applied to the grid of the tube, then the tube acts as a generator with low internal impedance during the pulse but a high internal impedance in the interval between pulses. This property is quite compatible with using the tube and transformer to drive an or-gate as shown in Figure 9. The transformer is connected so that a positive pulse on the amplifier grid 50 will produce a positive pulse at the transformer secondary terminal 51. This causes diode 52 to conduct. Since the tube and transformer together with diode 52 comprise a very low impedance source, a large positive pulse is produced at the output junction 53. Between pulses the voltage of the output terminal 51 of the transformer will swing negatively. During this time diode 52 will not conduct but the output junction 53 will be held at −8 volts by conduction of the clipping diode 54. The internal impedance of the tube and transformer between pulses causes no trouble; it is simply in series with the high back resistance of diode 52.

Figure 10:
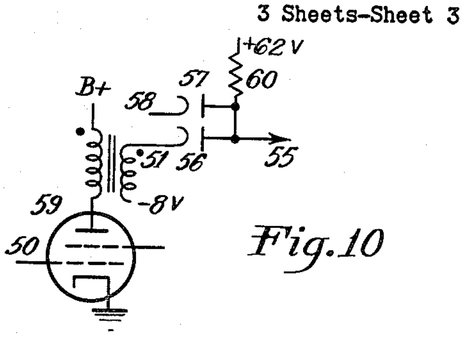
Figure 10 illustrates the use of an amplifier tube and pulse transformer as input means for an and-gate.
Figure 11:
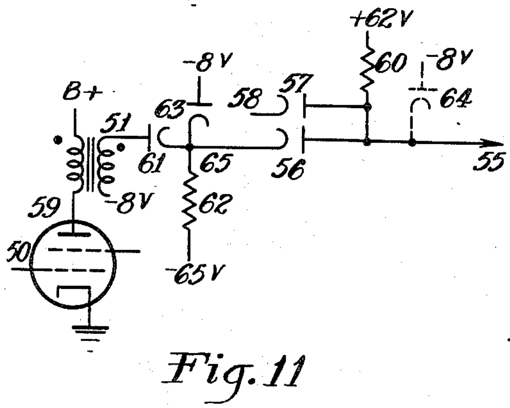
Figure 11 illustrates the use of a degenerate or-gate to prevent spurious signals.

On the other hand the tube and transformer combination will not drive an and-gate satisfactorily as can be seen by referring to Figure 10. During the intervals between pulses the output junction 55 must be held down to −8 volts by current flowing through and-gate diodes 56 or 57 and the secondary windings of their associated pulse transformers. If input 58 is pulsed positively, diode 57 will be rendered nonconducting and diode 56 must take over the current formerly conducted by diode 57, since no output is desired from the and-gate when only one input is pulsed. As explained above, the unpulsed tube 59 presents a high impedance in parallel with the open-circuit inductance of the transformer. Neither the tube's impedance nor the transformer's inductance can take on a sudden increase in current through diode 56 without a corresponding positive voltage appearing at terminal 51. Thus a spurious positive voltage signal will appear at the output junction 55. Now, since it has been shown that or-gates and and-gates can be connected in series satisfactorily and that a tube and transformer will satisfactorily drive an or-gate, a remedy for this malfunction is to introduce an or-gate (which may be degenerate) between the transformer and the and-gate as shown in Figure 11. The modification consists in adding the or-diode 61, its resistor 62, and a clipping diode 63 which may, if desired, be located at 64. Resistor 62 has a low enough resistance to equilibrate the following resistors 60 etc. below −8 volts but clipping diode 63 holds junction 65 to −8 volts, so diode 61 need not conduct current through the transformer's secondary 51.

There still remains in the circuit of Figure 11 a possible mode of malfunctioning. The current required by resistor 62 and normally supplied through clipping diode 63 or 64 may be partly supplied through diode 61 and the transformer secondary winding, since this winding is returned to −8 volts, the same level as the diode supply. In this case the pulsing of the and-gate input 58 might require the sudden decrease or stopping of this current in the transformer secondary which could not be accomplished without the appearance of a spurious positive voltage pulse at 51. The current responsible for this malfunction can be kept out of the transformer by returning the secondary winding to a lower voltage than −8, say to −10 volts. This will impress a back voltage across diode 61 which should exceed the forward drop across diode 63 or across 64 and 56 in series. Thus one can prevent current through diode 61.

Figure 12:
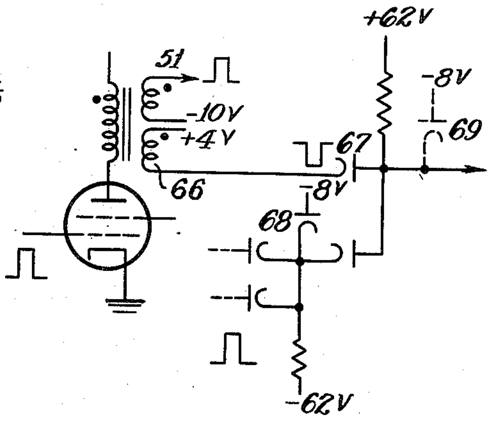
Figure 12 illustrates the typical manner of producing and utilizing negative pulses in gate circuitry.

A secondary winding connected in reversed polarity can be used to supply negative pulses to an and-gate to inhibit its normally positive output as shown in Figure 12. The negative winding 66 can be connected directly to the and-gate diode 67 because for negative pulses the action of this circuit is just like an or-gate. In this case the clipping diode returned to −8 volts must be located at 68 rather than at 69 in order to prevent its drawing excessive current from the negative pulse source.

Figure 13:
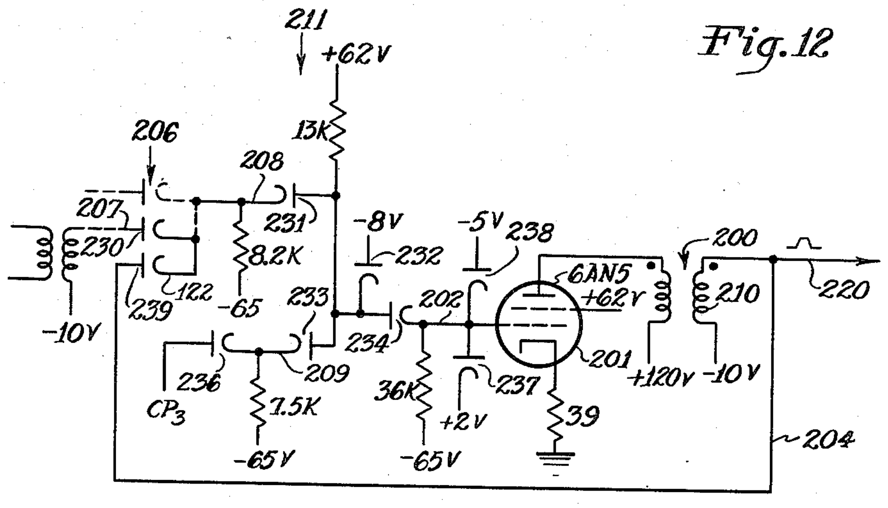
Figure 13 shows a circuit arrangement for practicing the invention at high-frequency pulse repetition rates, that is, at electronic speeds.

It will be seen that despite the simplicity of the basic gate circuit, there is a rather complex interaction of the elements and that each of these elements is essential to the successful operation of the gate circuit. In practice a very common arrangement is for one of the inputs, e. g., 11 of Figure 2, to be a clock pulse from a synchronized clock source, and the others to be actual computational or order-establishing pulses. Thus the "working" pulses are synchronized and reshaped by the clock pulse, the actual circuit arrangement of a typical stage being as shown in Figure 13. This is the same circuit as is shown in Figure 5 of the copending application, Serial No. 193,696, of Ralph J. Slutz, filed November 2, 1950, for "Regenerative Pulse Broadening," the synchronizing and reshaping features being no part of the present invention.

The arrangement shown in Figure 13 depicts one practical utilization circuit employing the principles of this invention. The only vacuum tube used in this circuit is shown at 201, and corresponds to the vacuum tube depicted in Figure 12. The output of this vacuum tube leads into a pulse transformer 200, whose secondary 210 is connected at 220 to the utilization circuit in the next stage. A lead 204 from the output is fed into the or-gate 206. Another input to or-gate 206 is provided by lead 207. This lead receives the input pulse from the preceding stage, which is in deteriorated form and is to be reshaped. The arrival of a pulse on lead 207 may serve to energize the entire stage; that is, the input pulse on 207 passes through to lead 208, thence through coincidence gate, i. e., and-gate 211. The detailed mode of operation of these gates will be described below. The pulse entering on lead 208 will not pass through or energize the coincidence gate unless and until there is also a clock pulse ($CP_3$) present at diode 236. Upon coincidence of pulses on leads 208 and 209, the reshaped pulse is transmitted on lead 202 to the grid of tube 201, the output of which is connected to the primary of pulse transformer 200. As long as the current in the primary of transformer 200 is increasing, the secondary 210 will have a voltage induced in it. This voltage must be of a duration sufficient to overlap the width of the widest clock pulse which may be used in the circuit. During the time that a voltage is being induced in secondary 210 of the pulse transformer 200, a voltage will appear on line 204, which will therefore pass through or-gate 206 to line 208 regardless of the presence or absence of the initiating pulse on line 207, and if the clock pulse is still present at line 209, the input on line 202 to tube 1 continues. This condition continues to exist until termination of the clock pulse on line 209, provided, of course, that the tube or transformer has not become saturated because of the steadily increasing current therethrough. This, of course, depends primarily on the impedance characteristic of transformer 200. If this transformer is properly designed it will readily maintain a pulse through it of sufficient duration to overlap the clock pulse and thus serve the intended purpose. It will be noted that, although crystal diode gates are shown, vacuum tube gates of known type could equally well be used for the and-gate and for the or-gate.

The mode of operation of the crystal diode gates will now be described. Assuming that the circuit is in the deenergized state, a positive pulse arriving on line 207 will be passed through the crystal diode 239 and appear on line 208, raising the potential of the cathode of crystal diode 231. The anode of crystal 231 has previously been held near −8 volts by the current flow through diode 232, resistor 13K, diodes 231 and 233 in parallel, and their respective resistors 8.2K and 7.5K; this voltage being such that the grid of tube 201 is biased to produce a low value of current flow. However, the coincidence of a positive input pulse on the cathode of diode 231 and a positive clock pulse on the cathode of diode 233 renders these diodes in effect nonconducting so far as the previously applied potential on their anodes is concerned. Therefore the current in resistor 13K must now flow through resistor 36K, whose resistance is higher than the previously available path and is so designed that the potential at the cathode of diode 234 (and therefore at the grid of tube 201) rises so that the tube becomes more conducting. The value of the rise is limited by "bumper" diode 237 whose cathode is supplied at the +2 volt level, so that if the grid voltage tends to rise above this value, diode 237 becomes conducting and limits the rise to about +2 volts. Similarly on the negative swing "bumper" diode 238 holds the voltage at the tube grid to −5 volts, so that the maximum voltage swing at the grid is 7 volts, which is sufficient with the tube employed to produce the desired operation.

Raising the grid bias of tube 201, as described, causes the tube to become more conducting. The resulting current rise in the primary of pulse transformer 200 causes a positive voltage to appear in about $\frac{1}{10}$ microsecond on line 204. This voltage is maintained while current is building up in the primary of transformer 200, which would continue for about 1 microsecond if not interrupted, with the particular design of transformer employed. Of course, a transformer of higher inductance would have a longer pulse duration time, but added distributed capacity would produce a slower rise time. The voltage on line 204 appears on diode 239 of or-gate 206 and thus regeneratively maintains the desired positive potential at the cathode of diode 231, so that as long as the clock pulse is present, the above-described condition is maintained. However, termination of the clock pulse again provides a conducting path through diode 233 and resistor 7.5K, and the potential of the grid falls promptly to its original value for tube 201. In practice, of course, the voltage rise described is not instantaneous but is determined by the RC constant of the circuit, the capacitance being that of the leads and grid, but this capacitance can easily be maintained sufficiently low so that the rise and fall times of the pulses are of a satisfactorily brief order compared to the pulse duration. It is noted that the reference characters applied to the resistors also denote their value in the usual manner, the letter K denoting 1000 ohms.

It will be apparent that instead of the diode type of gating shown, vacuum-tube gating could be employed. The advantage of the circuit shown is that it requires the use of only one vacuum tube, the other elements being inexpensive, long-lived crystal diodes, such as available germanium diodes, requiring no filament supply and permitting fairly simple circuitry. The use of a pulse transformer also eliminates an additional vacuum tube which would otherwise be required for voltage inversion. On the other hand it limits the duration of the maximum period of regeneration, since the voltage on the secondary dies out when steady-state conditions are attained. However, this is unimportant where one is dealing with clock pulses and utilization pulses whose duration is briefer still.

The operation of the improved gate circuit of Figure 14 will now be described in more detail. Signals from sources 121, 122, and 123 are combined at point 129 in an and-gate. Signals from other signal sources, not shown, may be fed in from leads 161 and 162 to point 130, which provides an or-gate that can pass a signal from any of lines 161, 162, or point 129 to the grid of the tube. These other signal sources may be essentially like the one which is described below. This or-gate is in contrast to the and-gate, all of whose inputs must be simultaneously energized to produce an output. Another or-gate is provided at the junction 139 of inputs 171, 181, and 141.

Considering again the first-mentioned and-gate, a positive pulse from the secondary 141 will, for the duration of the pulse, raise the potential of the anode of diode 151 above −10 volts. A small spurious signal of less than 2 volts will have no effect, but as soon as the anode potential exceeds −8 volts, the potential of the cathode of diode 123*a* is correspondingly raised, and current can no longer flow from resistor 128 and/or diode 147 through resistor 155. However, current from these sources can still flow through resistors 156 and 157, so the potential of point 129 remains at −8 volts. However, if there is a coincidence of input signals on all three lines 121–123, then all three diodes 121*a*–123*a* can no longer conduct as before, and the potential of point 129 rises. As soon as the lowest pulse voltage exceeds −5 volts, diode 144 begins to conduct current from the +62 volt source through resistor 128, this current passing through resistor 146. The potential at point 130 can rise only to +2 volts because of diode 138, whose cathode is tied to a +2-volt source, so the grid potential rises from −5 volts (actually slightly lower because of the drop through diode 133, which is only a fraction of a volt) to +2 volts at a rate determined by the resistance of 128 and 146, together with the distributed capacitance of the circuit between the grid and diode 123*a*, represented in dotted lines at 149 and 150. The voltages across resistors 128 and 146 are so designed that taken together with the measured circuit capacitance 149 and 150, the grid voltage rises at the desired rate, which in SEAC is 100 volts per microsecond. The grid voltage then remains at +2 volts until at least one pulse into the and-gate drops below +2 volts, when point 129 quickly goes down to −8 volts because of conduction through the deenergized input "or" resistor (one of 155, 146, or 157); when the potential of point 129 falls below that of 130, diode 144 ceases to conduct and point 130 (i. e., the grid potential) drops to −5 at a rate determined by the RC circuit consisting of capacitor 149 and resistor 146. It will thus be seen that a flat-topped pulse whose sides have a definite slope is produced at the grid, which results in a generally similar but amplified pulse output at 124.

The above-described gate circuit prevents small spurious signals from appearing at the grid of the vacuum tube, and also protects the circuit against heavy currents through the diodes if the source swings strongly negative.

The above circuit is used throughout SEAC and has functioned very satisfactorily to give extremely reliable operation. It will be appreciated that when this machine operates for many hours, as is often the case, at the rate of one million pulses a second without transmitting a single pulse improperly, the number of individual switching operations is a fantastic quantity, yet with the above design, such operation is routine. Since SEAC contains hundreds of such gates connecting circuits in a great number of possible ways, it will be appreciated that this or any similar computer has a unique problem in flexibility and reliability of operation.

It will be apparent that the embodiments shown are only exemplary and that various modifications can be made in construction and arrangement within the scope of our invention as defined in the appended claims.

We claim:

1. An electric pulse "gate" circuit having a plurality of input leads to a first junction point and an output lead and means operatively interconnecting said input and output leads for producing a predetermined output signal effect on said output lead only upon coincidence of voltage pulse signals on all said input leads, said means comprising: a constant voltage source of magnitude greater than said voltage pulse signal connected through a high impedance to said first junction point of said "gate" circuit; individual rectifier means in each of said input leads and connected in parallel to said first junction point, said rectifier means being arranged to divert current from said source so as to maintain a predetermined normal voltage level at said junction point, and being so oriented that a signal pulse on the associated input lead of a minimum predetermined amplitude prevents further current diversion through said rectifier, thereby causing a small voltage rise at said junction point upon such actuation of less than all inputs by respective input signals, but a large voltage rise upon simultaneous actuation of all signal inputs; a voltage-responsive signal-utilization device operatively connected to the output lead of said gate, diode means connected between said output lead and a source of constant potential of a value higher than the said predetermined normal voltage level by a difference greater than the small voltage rise caused by operation of less than all signal inputs, but less than the voltage rise caused by simultaneous operation of all signal inputs, said diode means being so oriented that current will flow only from said source to said output lead, a second impedance connected between said output lead and a constant voltage source of low level; rectifier means connected between said junction point and said output lead and so oriented that current can flow only from said first junction point to said output lead and not in the reverse direction, said second impedance being of such value that on coincidence of input signals on all the input leads the voltage of said junction point rises above the normal voltage of said output lead whereby current flows from said first impedance through said second impedance to maintain the output lead at a predetermined signal output potential higher than its normal nonactuated voltage level, and whereby small voltage rises at said junction point due to an input signal on less than all input leads are not effective to cause the spurious signal to be emitted.

2. The invention according to claim 1 above, including a third high impedance device connected from said input lead to a source of potential low with respect to said junction point, a low impedance input signal source, and additional rectifier means between each said input lead and said third high impedance device connected to pass a positive signal from said low impedance source and to block flow of current from said gate to said source.

3. The invention according to claim 2 above and an additional signal input line connected to said junction point, a low impedance negative signal-producing source connected to said input lead and a rectifier means between said source and said junction point oriented to pass current from said junction point toward said source, but not in the reverse direction, whereby a negative input signal coincident with positive input signals inhibits the effect of such signals.

4. The invention according to claim 2 in which one end of said low impedance signal source is connected to said input lead and the other end of the source is connected to a potential which is low with respect to said junction point.

5. An electric pulse "gate" circuit having a plurality of input leads to a first junction point and an output lead and means operatively interconnecting said input and output leads for producing a predetermined output signal effect on said output lead only upon coincidence of voltage pulse signals on all said input leads, said means comprising: a constant voltage source of magnitude greater than said voltage pulse signal connected through a high impedance to said first junction point of said "gate" circuit; individual rectifier means in each of said input leads and connected in parallel to said first junction point, said rectifier means being arranged to divert current from said source so as to maintain a predetermined normal voltage level at said junction point, and being so oriented that a signal pulse on the associated input lead of a minimum predetermined amplitude prevents further current diversion through said rectifier; a second high impedance device connected from said input lead to a source of potential low with respect to said junction point; a low impedance input signal source; and additional rectifier means between each said input lead and said second high impedance device connected to pass a positive signal from said low impedance source and to block flow of current from said gate to said source.

6. The invention according to claim 5 in which one end of said low impedance signal source is connected to said input lead and the other end of the source is connected to a potential which is low with respect to said junction point.

7. The invention according to claim 1, and an additional signal input line connected to said junction point, a low impedance negative signal-producing source connected to said input lead and a rectifier means between said source and said junction point oriented to pass current from said junction point toward said source, but not in the reverse direction, whereby a negative input signal coincident with positive input signals inhibits the effect of such signals.

References Cited in the file of this patent

UNITED STATES PATENTS

| | | |
|---|---|---|
| 2,535,303 | Lewis | Dec. 26, 1950 |
| 2,557,729 | Eckert | June 19, 1951 |
| 2,570,716 | Rochester | Oct. 9, 1951 |

OTHER REFERENCES

"Digital Computer Switching Circuits," by C. H. Page, Electronics, September 1948, pages 110 to 118.

Proceedings of I. R. E., May 1950, vol. 38, pages 511 to 514, "Diode Coincidence and Mixing Circuits in Digital Computers," by Tung Chang Chen.